(12) United States Patent
Cheng et al.

(10) Patent No.: US 12,330,520 B2
(45) Date of Patent: Jun. 17, 2025

(54) OFF-BOARD CHARGER, CHARGING SYSTEM, AND CHARGING STATION

(71) Applicant: Huawei Digital Power Technologies Co., Ltd., Guangdong (CN)

(72) Inventors: Dong Cheng, Shenzhen (CN); Mengxiong Liao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 7 days.

(21) Appl. No.: 18/452,491

(22) Filed: Aug. 18, 2023

(65) Prior Publication Data

US 2024/0059165 A1 Feb. 22, 2024

(30) Foreign Application Priority Data

Aug. 18, 2022 (CN) .......................... 202210991036.5

(51) Int. Cl.
*B60L 53/14* (2019.01)
*B60L 53/10* (2019.01)
*B60L 53/22* (2019.01)
*B60L 53/31* (2019.01)
*B60L 53/62* (2019.01)
(Continued)

(52) U.S. Cl.
CPC ............... *B60L 53/22* (2019.02); *B60L 53/11* (2019.02); *B60L 53/14* (2019.02); *B60L 53/31* (2019.02); *B60L 53/62* (2019.02); *B60L 53/65* (2019.02); *H02J 7/02* (2013.01); *B60L 2210/10* (2013.01); *B60L 2210/30* (2013.01); *H02J 2207/20* (2020.01)

(58) Field of Classification Search
CPC .......... B60L 53/11; B60L 53/14; B60L 53/16; B60L 53/22; B60L 53/30; B60L 53/31; B60L 53/60; B60L 53/62; B60L 53/65; B60L 2210/10; B60L 2210/30; H02J 7/02; H02J 2207/20
See application file for complete search history.

(56) References Cited

U.S. PATENT DOCUMENTS 9,126,489 B2 * 9/2015 Herzog .................. B60L 53/14
9,566,867 B2 * 2/2017 Kydd ..................... H02J 3/322
(Continued)

FOREIGN PATENT DOCUMENTS

CN 207098723 U 3/2018
CN 111525196 A 8/2020
(Continued)

*Primary Examiner* — Levi Gannon

(57) ABSTRACT

This application provides an off-board charger, a charging system, and a charging station. The off-board charger includes a power conversion circuit, a power supply port, a conversion adapter, and a controller. The conversion adapter includes a connection port and an alternating current output port. The controller controls, when the conversion adapter is connected to the power supply port, the power supply port to connect to an alternating current power grid, the power supply port to connect to the connection port, and the alternating current output port to connect to a charging port of a powered device; or controls, when the conversion adapter is disconnected from the power supply port, the power conversion circuit to connect to an alternating current power grid, and the power supply port to connect to the charging port of the powered device.

17 Claims, 12 Drawing Sheets

(51) Int. Cl.
*B60L 53/65* (2019.01)
*H02J 7/02* (2016.01)

(56) References Cited

U.S. PATENT DOCUMENTS

| | | | | |
|---|---|---|---|---|
| 2012/0212174 | A1* | 8/2012 | Ishikawa | H01M 10/46 |
| | | | | 320/103 |
| 2013/0049676 | A1* | 2/2013 | Ishikawa | B60L 53/53 |
| | | | | 320/103 |
| 2013/0049677 | A1* | 2/2013 | Bouman | B60L 1/02 |
| | | | | 320/106 |
| 2020/0384871 | A1* | 12/2020 | Otsuka | H02G 15/08 |
| 2021/0006082 | A1* | 1/2021 | Wei | H02J 7/0047 |
| 2021/0402888 | A1* | 12/2021 | Alves | B60L 53/14 |
| 2022/0396167 | A1* | 12/2022 | Sharifipour | B60L 53/51 |
| 2023/0094716 | A1* | 3/2023 | Zenner | B60L 1/006 |
| | | | | 320/109 |

FOREIGN PATENT DOCUMENTS

| | | |
|---|---|---|
| CN | 212579671 U | 2/2021 |
| CN | 113858991 A | 12/2021 |

\* cited by examiner

OFF-BOARD CHARGER, CHARGING SYSTEM, AND CHARGING STATION

CROSS-REFERENCE TO RELATED APPLICATION

This application claims priority to Chinese Patent Application No. 202210991036.5, filed on Aug. 18, 2022, which is hereby incorporated by reference in its entirety.

TECHNICAL FIELD

The present invention relates to the field of vehicle charging technologies, and in particular, to an off-board charger, a charging system, and a charging station.

BACKGROUND

A battery electric vehicle generally has two different types of charging interfaces: an alternating current charging interface and a direct current charging interface, where the alternating current charging interface corresponds to an alternating current charging device, and the direct current charging interface corresponds to a direct current charging device. A plug-in hybrid electric vehicle has only one alternating current charging interface and can only be charged via an alternating current charging device. The plug-in hybrid electric vehicle is a hybrid electric vehicle in which a vehicle power battery is charged by using an external power supply. The plug-in hybrid electric vehicle has two power generation systems: an engine and an electric motor. The two power generation systems can not only work independently of each other, but also work together, to drive the vehicle forward.

In most electric vehicle charging places configured with direct current charging devices, the plug-in hybrid electric vehicle cannot be charged. When there is no appropriate place for charging, the plug-in hybrid electric vehicle switches to the engine power generation system more often, which increases carbon emissions. In addition, in a large-scale landing and promotion environment of low-power direct current charging devices, more low-power direct current charging devices are arranged in the electric vehicle charging places, and charging difficulty of the remaining plug-in hybrid electric vehicles gradually increases.

At present, there is a design solution of a charging pile in which an alternating current charging device and a direct current charging device are integrated, that is, one charging pile is designed with two charging loops: a direct current charging loop and an alternating current charging loop. The charging pile is provided with both a direct current charging gun (connected to the direct current charging loop) and an alternating current charging gun (connected to the alternating current charging loop). A user may choose to insert the direct current charging gun/alternating current charging gun into a charging interface on a device based on an actual requirement of an electric vehicle, to meet a charging requirement. However, in the solution, the two charging guns and more charging cables need to be disposed. Alternatively, at present, an alternating current charging interface of a plug-in hybrid electric vehicle may be transformed into a direct current charging interface, so that a direct current charging device can be directly used for charging. However, the solution requires reconstruction of an electrical system of the electric vehicle, and existing models that have been produced and delivered cannot be reconstructed. As a result, the solution cannot be compatible with all models on the market.

In view of this, a solution for charging a plug-in hybrid electric vehicle is needed to provide a charging service for the plug-in hybrid electric vehicle through a direct current charging interface.

SUMMARY

This application provides an off-board charger, a charging system, and a charging station, to provide a charging service for a plug-in hybrid electric vehicle through a direct current charging interface.

According to a first aspect, this application provides an off-board charger. The off-board charger includes a power conversion circuit, a power supply port, a conversion adapter, and a controller; the conversion adapter includes a connection port and an alternating current output port, the connection port is configured to be connected to the power supply port, and the alternating current output port is configured to be connected to a charging port of a powered device; and the controller is configured to: control, when the conversion adapter is connected to the power supply port, the power supply port to connect to an alternating current power grid, the power supply port to connect to the connection port, and the alternating current output port to connect to the charging port of the powered device; or control, when the conversion adapter is disconnected from the power supply port, an input end of the power conversion circuit to connect to an alternating current power grid, and the power supply port to connect to the charging port of the powered device.

The off-board charger provided in this application can not only provide a direct current charging service for a battery electric vehicle, but also provide an alternating current charging service for a plug-in hybrid electric vehicle. In addition, because of a newly added conversion adapter design, one off-board charger implements functions of both alternating current charging and direct current charging. This omits an alternating current charging gun cable and reduces costs. When the power supply port is connected to the conversion adapter, the power supply port connected to the conversion adapter can provide the alternating current charging service; or when the power supply port is disconnected from the conversion adapter, the power supply port in the off-board charger can provide the alternating current charging service.

In a possible implementation, the off-board charger further includes a connection confirmation port; and the controller is specifically configured to: control, when a voltage of the connection confirmation port is a first voltage, the power supply port to connect to the alternating current power grid, the power supply port to connect to the connection port, and the alternating current output port to connect to the charging port of the powered device; or control, when a voltage of the connection confirmation port is a second voltage, the input end of the power conversion circuit to connect to the alternating current power grid, and the power supply port to connect to the charging port of the powered device. When detecting that the voltage of the connection confirmation port changes to the first voltage, the controller enables the alternating current power grid to selectively and directly connect to the power supply port, so as to directly provide, through the power supply port, an alternating current provided by the alternating current power grid to the powered device. After detecting that the voltage of the connection confirmation port changes to the second voltage, the controller enables the alternating current power grid to selectively connect to the input end of the power conversion circuit, so that the power conversion circuit converts an alternating current provided by the alternating current power grid into a direct current, and then the direct current is provided to the powered device through the power supply port.

To enable the off-board charger to complete handshake communication with the powered device, in a possible implementation, the conversion adapter further includes an identification resistor circuit, the identification resistor circuit is configured to adjust an identification resistance of the alternating current output port; and the controller is further configured to: control, when the conversion adapter is connected to the power supply port, the identification resistor circuit to adjust the identification resistance of the alternating current output port, so that an identification resistance of the alternating current output port is a target resistance and the off-board charger completes handshake communication with the powered device.

In a possible implementation, the connection confirmation port specifically includes a first charging connection port and a second charging connection port; the connection port specifically includes a first power port and a third charging connection port, the alternating current output port specifically includes a second power port, a fourth charging connection port, and a charging control confirmation port, the power supply port, the first power port, and the second power port are configured to be connected in series, and the first charging connection port, the third charging connection port, and the charging control confirmation port are configured to be connected in series; and the controller is specifically configured to: control, when a voltage of the first charging connection port is the first voltage, the power supply port to connect to the alternating current power grid, the power supply port to connect to the connection port, and the alternating current output port to connect to the charging port of the powered device; or control, when a voltage of the first charging connection port is the second voltage, the input end of the power conversion circuit to connect to the alternating current power grid, and the power supply port to connect to the charging port of the powered device; and transmit a charging communication signal between the off-board charger and the powered device through the second charging connection port.

The connection confirmation port specifically includes the first charging connection port and the second charging connection port. The first charging connection port can be used as a detection point for voltage detection performed by the controller, or can be used as a CC1 port of direct current charging handshake communication, and the second charging connection port can be used as a CC2 port of direct current charging handshake communication.

In a possible implementation, the off-board charger further includes a first ground port, a first resistor, and a first switch, the connection port further includes a second ground port, the alternating current output port further includes a third ground port, the first ground port, the second ground port, and the third ground port are configured to be connected in series, and the first ground port and the first charging connection port are connected in series by using the first resistor and the first switch; and when the power supply port is connected to the conversion adapter, the first switch is triggered to be turned on, so that the voltage of the first charging connection port changes to the first voltage; or when the power supply port is disconnected from the conversion adapter, the first switch is triggered to be turned off, so that the voltage of the first charging connection port changes to the second voltage.

The first ground port, the second ground port, and the third ground port are configured to be connected in series, and can be used as protection ground ports to penetrate a connection between the power supply port and the conversion adapter. When the first switch is turned on, the first resistor is connected to the circuit, so that a divided voltage value of the first charging connection port changes. A charging mode of the powered device is determined based on different voltage values of the first charging connection port.

In a possible implementation, the off-board charger further includes a second resistor, and the first ground port is connected to the second charging connection port by using the second resistor.

In a possible implementation, one end of the identification resistor circuit is connected to the third ground port, and the other end of the identification resistor circuit is connected to the fourth charging connection port. The identification resistor circuit in the conversion adapter enables the identification resistance output by the alternating current output port meet a CC resistance specified in the national standard, thereby completing handshake communication.

In a possible implementation, when being configured to be connected in series, the first charging connection port, the third charging connection port, and the charging control confirmation port are applicable to transmission of the charging communication signal between the off-board charger and the powered device.

In a possible implementation, the power supply port further includes a positive end of the power supply port and a negative end of the power supply port, the alternating current power grid is connected to the input end of the power conversion circuit through a first-phase alternating current power port, a second-phase alternating current power port, and a third-phase alternating current power port, or the alternating current power grid is connected to the positive end of the power supply port through any one of a first-phase alternating current power port, a second-phase alternating current power port, and a third-phase alternating current power port, and the negative end of the power supply port is connected to a three-phase input neutral wire of the alternating current power grid.

In a possible implementation, the off-board charger further includes a second switch group and a third switch group; and the alternating current power grid is connected to the power supply port by using the second switch group, the alternating current power grid is connected to the third switch group by using the power conversion circuit, and when the second switch group is turned on, the third switch group is turned off, or when the second switch group is turned off, the third switch group is turned on. An on/off relationship between switch groups on two sides of the power conversion circuit is also mutually exclusive. When it is determined that the powered device is in the alternating current charging mode, the identification resistance of the alternating current output port is adjusted to the target resistance, the alternating current power grid is controlled to connect to the power supply port by using the second switch group, and the power supply port is controlled to connect to the charging port of the powered device by using the conversion adapter; or when the powered device is in the direct current charging mode, the alternating current power grid is controlled to connect to the input end of the power conversion circuit by using the third switch group, and the power supply port is controlled to connect to the charging port of the powered device.

In a possible implementation, the controller is further configured to: output, when the conversion adapter is connected to the power supply port, a first communication signal to the connection confirmation port; or output, when the conversion adapter is disconnected from the power supply port, a second communication signal to the connection confirmation port. The controller can implement a control guidance function, and can meet direct current/alternating current handshake communication requirements of all electric vehicles meeting a national standard requirement. When it is determined that the powered device is in the alternating current charging mode, because a CP signal required for communication in the alternating current charging mode is a PWM signal, the first communication signal is output to the connection confirmation port; or when the powered device is in the direct current charging mode, because a CC1 signal required for communication in the direct current charging mode is a step signal, the second communication signal is output to the connection confirmation port.

In a possible implementation, the off-board charger further includes an auxiliary power supply, an positive port of the auxiliary power supply, and a negative port of the auxiliary power supply, a positive output of the auxiliary power supply is connected to one end of the positive port of the auxiliary power supply, a negative output of the auxiliary power supply is connected to one end of the negative port of the auxiliary power supply, and when the power supply port is connected to the conversion adapter, the other end of the positive port of the auxiliary power supply and the other end of the negative port of the auxiliary power supply each are in an idle state. In actual application, compared with the alternating current off-board charger, the direct current off-board charger has two more ports, namely, the positive port of the auxiliary power supply and the negative port of the auxiliary power supply. There is no actual signal or current transmission between the two ports and the powered device. Therefore, the two ports are set to the idle state, and the two ports do not need to be connected to the powered device.

In a possible implementation, the power conversion circuit includes an alternating current-direct current circuit and a direct current-direct current circuit; and an input end of the alternating current-direct current circuit and the power supply port are configured to connect to the alternating current power grid, an output end of the alternating current-direct current circuit is connected to an input end of the direct current-direct current circuit, and an output end of the direct current-direct current circuit is connected to the power supply port. The alternating current-direct current circuit is configured to convert an alternating current provided by the alternating current power grid into a direct current, and the alternating current-direct current circuit is configured to adjust the direct current voltage output by the alternating current-direct current circuit, so as to meet a charging requirement of the powered device.

According to a second aspect, this application provides a charging system. The charging system includes a charging pile and a powered device, and the charging pile includes the off-board charger in the first aspect; and the charging pile is configured to charge the powered device.

According to a third aspect, this application further provides a charging station. The charging station includes at least one charging pile, and each charging pile includes the off-board charger in the first aspect; and a charging pile is configured to charge a powered device connected to the charging pile.

For technical effects that can be achieved in the second aspect and the third aspect, refer to the technical effects that can be achieved in any possible design of the first aspect. Details are not described herein again.

DESCRIPTION OF EMBODIMENTS

Figure 1:
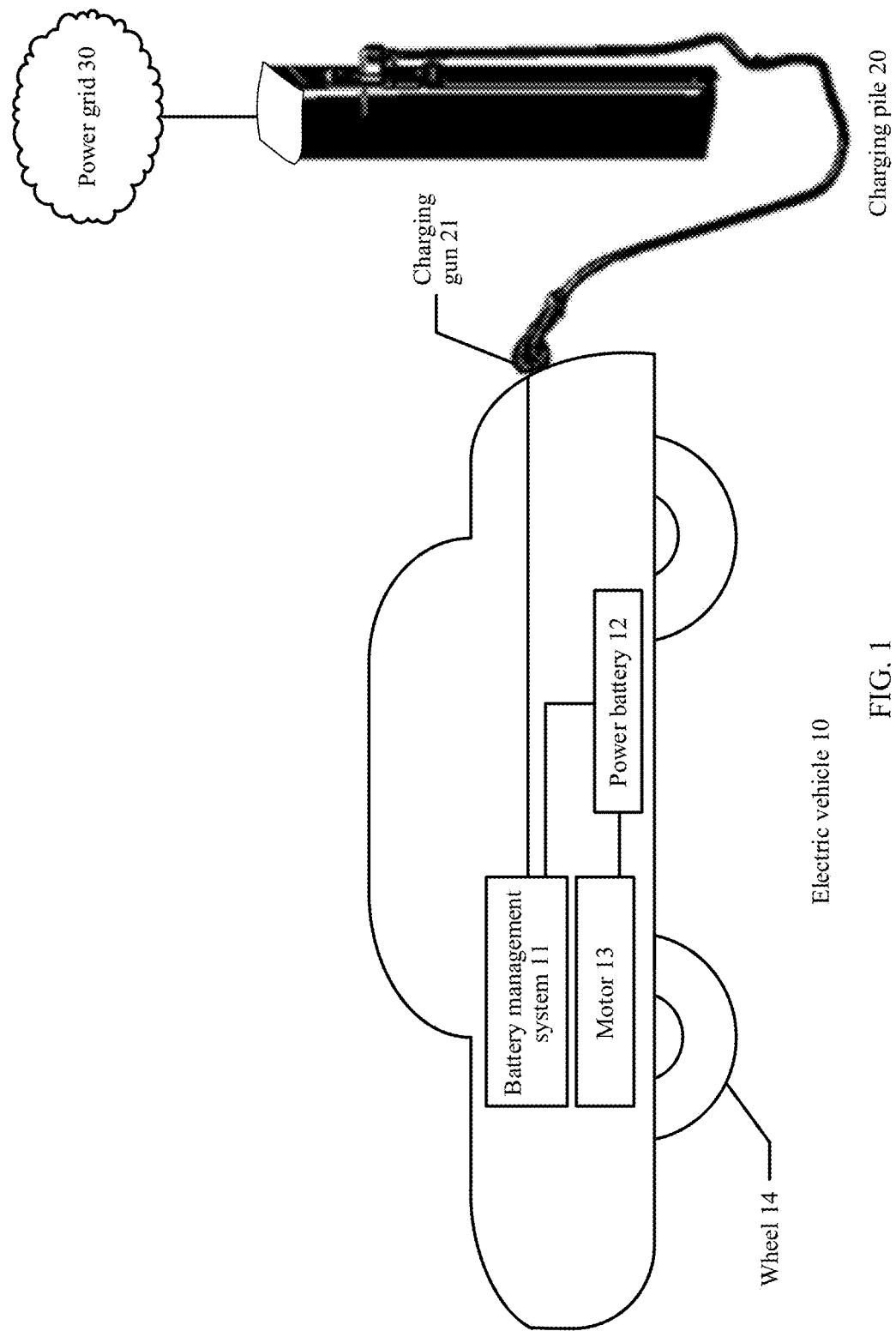
FIG. 1 is a schematic diagram of a charging scenario of an electric vehicle.

To make the objectives, technical solutions, and advantages of this application clearer, the following further describes this application in detail with reference to the accompanying drawings. However, the example implementation may be implemented in a plurality of forms, and it should not be understood as being limited to the example implementations described herein. Conversely, the implementations are provided to make this application more comprehensive and complete, and comprehensively convey the idea of the example implementations to a person skilled in the art. In the figures, same reference numerals indicate same or similar structures, and therefore repeated descriptions thereof are omitted. Expressions of positions and directions in this application are described by using the accompanying drawings as an example. However, changes may be made based on a requirement, and the changes fall within the protection scope of this application. The accompanying drawings in this application are merely used to illustrate a relative position relationship and do not represent a true scale.

Some terms in embodiments of this application are first explained and described, so as to facilitate understanding by a person skilled in the art.

(1) Connection confirm (connection confirm, CC) signal: A connection confirm signal is a function signal that indicates, electronically or mechanically, a state in which a vehicle plug is connected to an electric vehicle and/or a power supply plug is connected to a charging device. A port for transmitting a CC signal is a CC port. According to provisions of the Electric Vehicle Conductive Power Supply System standard, for an alternating current-charged electric vehicle, a battery management system in the electric vehicle determines a power supply capability of a charging pile and a type of a charging cable connecting the charging pile and a battery management system by comparing resistances between the CC port and the battery management system. For a direct current-charged electric vehicle, a port for transmitting a CC signal is further subdivided into two CC ports, namely, a CC1 port and a CC2 port. A CC1 signal is a connection confirm signal on a charging pile side, and a CC2 signal is a connection confirm signal on a vehicle side.

(2) Control pilot (control pilot, CP) signal: A control pilot signal is a communication signal for interaction and monitoring between an electric vehicle and an electric vehicle power supply device during alternating current charging.

(3) Battery management system (battery management system, BMS): A battery management system is a control system that protects use safety of a power battery in an electric vehicle, monitors a use status of the power battery, alleviates inconsistency of the power battery by using necessary measures, and provides safety guarantee for use of the power battery.

A plug-in hybrid electric vehicle is a hybrid electric vehicle in which a vehicle power battery is charged by using an external power supply. The plug-in hybrid electric vehicle has two power generation systems. FIG. 1 is only a schematic diagram of a scenario in which a power battery is used to drive a vehicle forward. Refer to FIG. 1. The electric vehicle 10 mainly includes a battery management system 11, a power battery 12, a motor 13, and a wheel 14.

The power battery 12 may be a battery with a large capacity and high power. The power battery 12 may provide electrical power to some or all of components of the electric vehicle 10. In some examples, the power battery 12 may be composed of one or more rechargeable lithium-ion or lead-acid batteries. In addition, the power battery 12 may further use another power supply material and configuration. This is not limited herein. When the electric vehicle 10 travels, the power battery 12 may provide power to the motor 13 by using a motor control unit (motor control unit, MCU) in the battery management system 11. The motor 13 converts electric energy provided by the power battery 12 into mechanical energy, to drive the wheel 14 to rotate, so that the electric vehicle 10 travels.

When the electric vehicle 10 is charged, the power battery 12 in the electric vehicle 10 may generally be charged by using a charging pile 20. Still as shown in FIG. 1, the charging pile 20 mainly includes a power supply circuit (not shown in FIG. 1) and a charging gun 21. One end of the power supply circuit is connected to a power grid 30, and the other end is connected to the charging gun 21 through a cable. An operator may insert the charging gun 21 into a charging socket of the electric vehicle 10, so that the charging gun 21 is connected to the battery management system 11 in the electric vehicle 10, and then the power supply circuit of the charging pile 20 can be used to charge the power battery 12 by using the charging gun 21.

A battery electric vehicle generally has two types of charging interfaces (an alternating current charging interface and a direct current charging interface), the alternating current charging interface corresponds to an alternating current charging device (an alternating current charging socket), and the direct current charging interface corresponds to a direct current charging device (a direct current charging socket). A plug-in hybrid electric vehicle has only one alternating current charging interface and can only be charged by using an alternating current charging device. Charging devices configured in most electric vehicle charging places are direct current charging devices, and therefore the plug-in hybrid electric vehicle cannot be charged.

In view of this, this application provides an off-board charger and a charging system, to provide a charging service for a plug-in hybrid electric vehicle through a direct current charging interface.

Figure 2A:
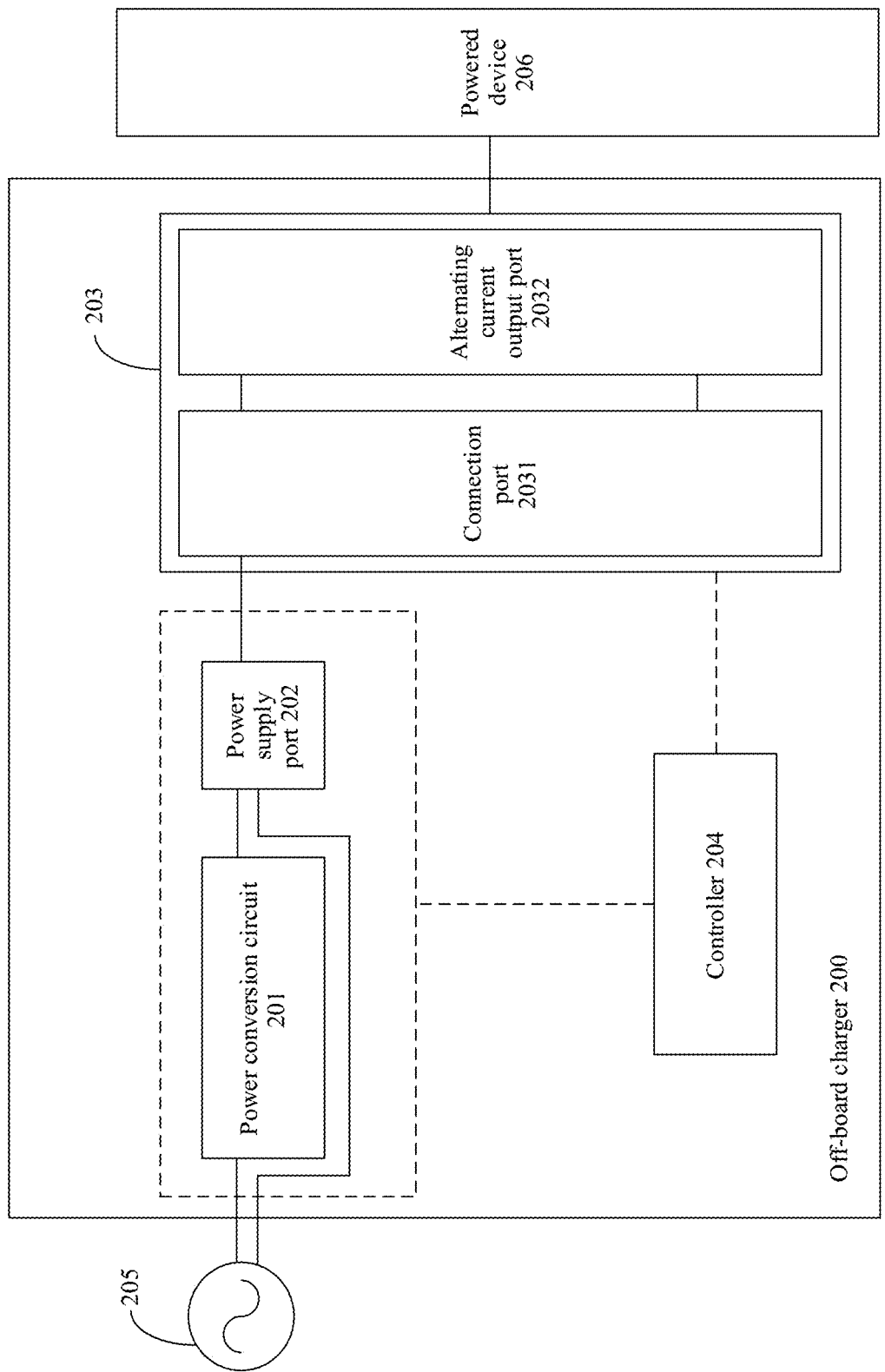
FIG. 2A is a schematic diagram 1 of a structure of an off-board charger.

FIG. 2A is a schematic diagram 1 of a structure of an off-board charger. The off-board charger 200 includes a power conversion circuit 201, a power supply port 202, a conversion adapter 203, and a controller 204. In this application, the conversion adapter 203 is newly added, so that one charger implements both alternating current charging and direct current charging. This omits an alternating current charging gun cable and reduces costs. The off-board charger 200 may be disposed in the charging pile 20 in the foregoing embodiment, and the power supply port 202 may be considered as an output interface of the charging gun 21 in the foregoing embodiment. When being configured to be connected to the power supply port 202, the conversion adapter 203 may be connected to the power supply port through a hardware structure, that is, directly connected by using a buckle, or in a manner of installing a cable. A manner of connecting the conversion adapter 203 to the power supply port 202 may be but is not limited to the foregoing manners. A specific connection manner is not limited herein.

An output end of the power conversion circuit 201 is connected to the power supply port 202. The power supply port 202 is specifically configured with a direct current positive output (DC+) and a direct current negative output (DC−). A direct current output from the power supply port 202 is input to a powered device 206 through the direct current positive output (DC+) and the direct current negative output (DC−). The direct current positive output (DC+) is used as a positive electrode, and the direct current negative output (DC−) is used as a negative electrode. An electrical potential of the positive electrode is high and an electrical potential of the negative electrode is low. When the two electrodes are connected to a circuit, a constant electrical potential difference between the two ends of the circuit can be maintained. Therefore, a current from the positive electrode to the negative electrode is formed in the circuit to stably charge the powered device 206.

In addition, the power supply port 202 may further include a protecting grounding (protecting earthing, PE) port, and the like. The protecting grounding port may be used as a grounding lead of a device.

An alternating current power grid 205 may be selectively connected to an input end of the power conversion circuit 201 or the power supply port 202. When the power supply port 202 is directly connected to the powered device 206 in a direct current charging mode, the alternating current power grid 205 is selectively connected to the input end of the power conversion circuit 201, so that an alternating current provided by the alternating current power grid 205 is converted into a direct current through the power conversion circuit 201, and the direct current is provided to the powered device 206 through the power supply port 202. However, when the power supply port 202 is connected to the powered device 206 in an alternating current charging mode by using the conversion adapter 203, the alternating current power grid 205 is selectively and directly connected to the power supply port 202, so that an alternating current provided by the alternating current power grid 205 is directly provided to the powered device 206 through the power supply port 202.

A connection relationship between the alternating current power grid 205 and the input end of the power conversion circuit 201 or the power supply port 202 may be determined by whether the conversion adapter 203 is connected to the power supply port 202. When the conversion adapter 203 is connected to the power supply port 202, the power supply port 202 is controlled to connect to the alternating current power grid 205, and the power supply port 202 is controlled to connect to a charging port of the powered device 206 through the conversion adapter 203; or when the conversion adapter 203 is disconnected from the power supply port 202, the input end of the power conversion circuit 201 is controlled to connect to the alternating current power grid 205, and the power supply port 202 is controlled to connect to the charging port of the powered device 206.

In a possible implementation, the off-board charger 200 further includes a connection confirmation port 2022. The controller 204 is specifically configured to: control, when a voltage of the connection confirmation port 2022 is a first voltage, the power supply port 202 to connect to the alternating current power grid 205, the power supply port 202 to connect to a connection port 2031, and an alternating current output port 2032 to connect to the charging port of the powered device 206; or control, when a voltage of the connection confirmation port 2022 is a second voltage, the input end of the power conversion circuit 201 to connect to the alternating current power grid 205, and the power supply port 202 to connect to the charging port of the powered device 206.

The controller 204 determines the connection relationship between the input end of the power conversion circuit 201 or the power supply port 202 and the alternating current power grid 205 based on the voltage of the connection confirmation port 2022 of the power supply port 202. The connection confirmation port 2022 may be connected to an auxiliary power supply inside the off-board charger 200, and the voltage of the connection confirmation port may be switched by using an internal voltage divider circuit. When the conversion adapter 203 is connected to the power supply port 202, the voltage divider circuit may adjust the voltage of the connection confirmation port 2022 to the first voltage; or when the conversion adapter 203 is disconnected from the power supply port 202, the voltage divider circuit adjusts the voltage of the connection confirmation port 2022 to the second voltage.

When the power supply port 202 is connected to the conversion adapter 203, the voltage of the connection confirmation port 2022 changes to the first voltage. When detecting that the voltage of the connection confirmation port 2022 changes to the first voltage, the controller 204 enables the alternating current power grid 205 to selectively and directly connect to the power supply port 202, so that the alternating current provided by the alternating current power grid 205 is directly provided to the powered device 206 through the power supply port 202. When the power supply port 202 is disconnected from the conversion adapter 203, the voltage of the connection confirmation port 2022 changes to the second voltage. After detecting that the voltage of the connection confirmation port changes to the second voltage, the controller 204 enables the alternating current power grid 205 to selectively connect to the input end of the power conversion circuit 201, so that the alternating current provided by the alternating current power grid 205 is converted into the direct current through the power conversion circuit 201, and the direct current is provided to the powered device 206 through the power supply port 202.

The controller 204 may be a general-purpose central processing unit (central processing unit, CPU), a general-purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or any combination thereof. Alternatively, the processor may be a combination for implementing a computing function. For example, the controller 204 may include a combination of one or more microprocessors, or a combination of a DSP and a microprocessor. The controller 204 may further include an analog to digital converter (analog to digital converter, ADC), configured to obtain the voltage of the connection confirmation port 2022.

The conversion adapter 203 includes the connection port 2031 and the alternating current output port 2032, where the connection port 2031 is configured to be connected to the power supply port 202, and the alternating current output port 2032 is configured to be connected to the charging port of the powered device 206. It should be noted that the conversion adapter 203 in this embodiment does not have a function of converting a direct current to an alternating current, and only needs to communicate with the power supply port 202 and the powered device 206.

Figure 2B:
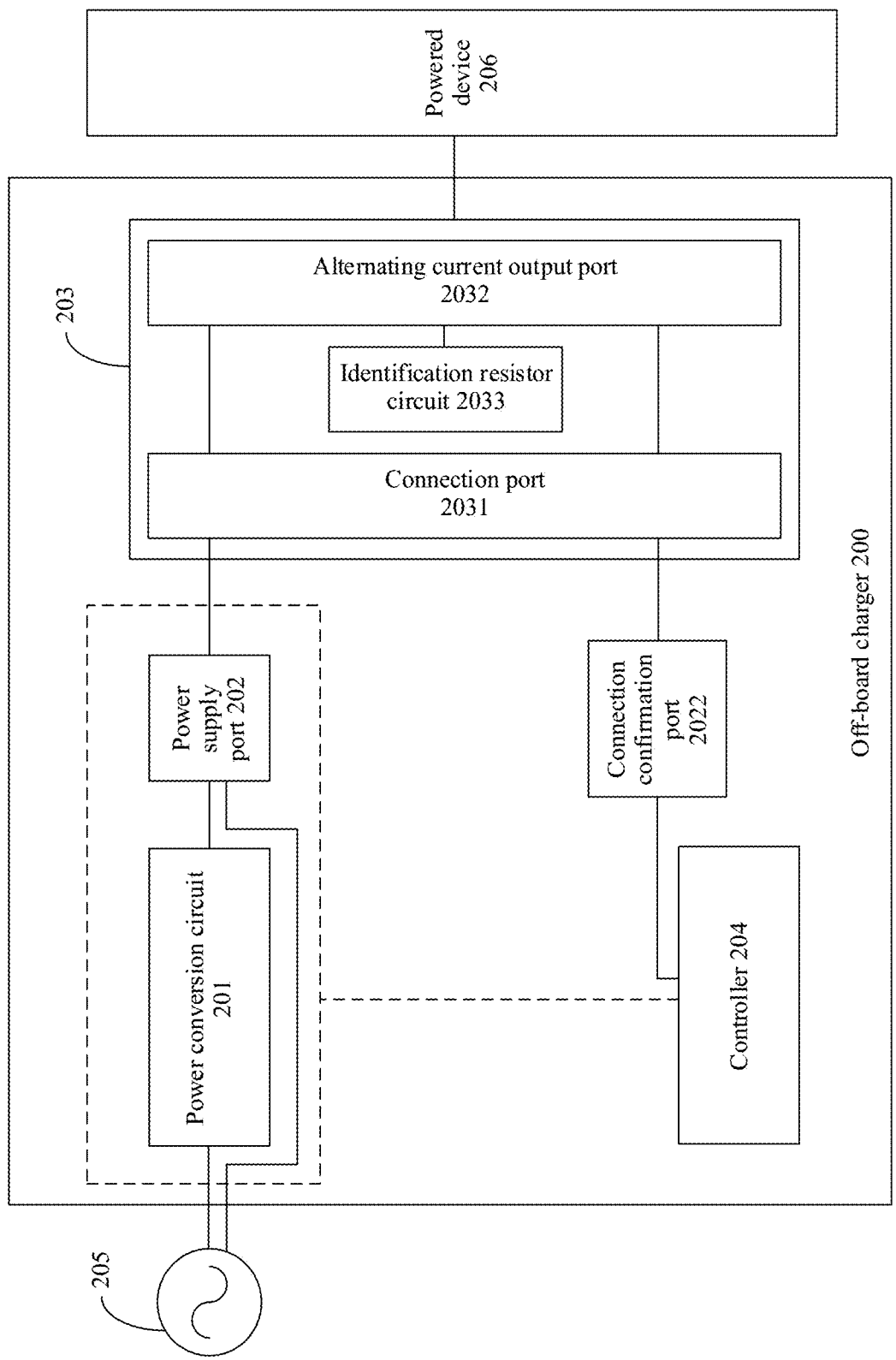
FIG. 2B is a schematic diagram of a structure of an off-board charger including an identification resistor circuit.

To enable the off-board charger 200 to complete handshake communication with the powered device 206, in a possible implementation, FIG. 2B is a schematic diagram of a structure of the off-board charger including an identification resistor circuit. The conversion adapter 203 further includes the identification resistor circuit 2033, where the identification resistor circuit 2033 is configured to adjust an identification resistance of the alternating current output port 2032. The controller 204 is further configured to: control, when the conversion adapter 203 is connected to the power supply port 202, the identification resistor circuit 2033 to adjust the identification resistance of the alternating current output port 2032, so that an identification resistance of the alternating current output port 2032 is a target resistance and the off-board charger 200 completes handshake communication with the powered device 206.

Charging devices configured in most electric vehicle charging places are direct current charging devices. Therefore, this application is used to reconstruct, by using the conversion adapter 203, the power supply port 202 in the direct current charging device into an interface that can be connected to and communicated with an alternating current charging socket. In addition, based on Explanation (1), interfaces corresponding to connection confirm signals are different and internal circuit structures are different during handshake communication in a direct current charging scenario and an alternating current charging scenario (a CC port and a CP port are required for communication in the alternating current charging scenarios, and a CC1 port and a CC2 port are required for communication in direct current charging scenario). Therefore, in this application, an interface of the power supply port 202 can be reconfigured through the conversion adapter 203, so as to provide a charging service for a plug-in hybrid electric vehicle through an alternating current/direct current charging interface.

For example, the conversion adapter 203 is connected to the power supply port 202 (the powered device 206 is in the alternating current charging mode). If the off-board charger 200 is used to charge the powered device 206, in addition to an alternating current connection, an interface connecting to the power supply port 202 and an alternating current charging socket of the powered device 206 has signal transmission ports: a CC signal port for transmitting a CC signal and a CC signal port for transmitting a CP signal. There is a level signal between the CC signal port and the alternating current charging interface of the powered device 206, the CP signal is a PWM signal, and different duty cycles of the PWM signal are for transmitting different communication content.

However, a charging interface originally providing a charging service for a direct current powered device does not have the CC signal port for transmitting a CC signal. Therefore, the conversion adapter 203 is added in this application. The identification resistor circuit 2033 in the conversion adapter 203 enables the identification resistance output by the alternating current output port 2032 to meet a specified CC resistance in the Electric Vehicle Conductive Power Supply System standard, so as to complete handshake communication.

The powered device 206 may include a battery management system for determining, by comparing a resistance between a CC signal identification port and a battery management system, a power supply capability of the off-board charger 200 and a charging type between the off-board charger 200 and the battery management system. In addition, the off-board charger 200 further determines output power of the off-board charger 200 by using the duty cycle of the CP signal. After the battery management system completes a related charging configuration based on the power supply capability and the output power of the off-board charger 200, the battery management system controls an on board charger (on board charger, OBC) inside the powered device 206 to receive electric energy provided by the off-board charger 200, so as to charge the power battery.

Figure 3:
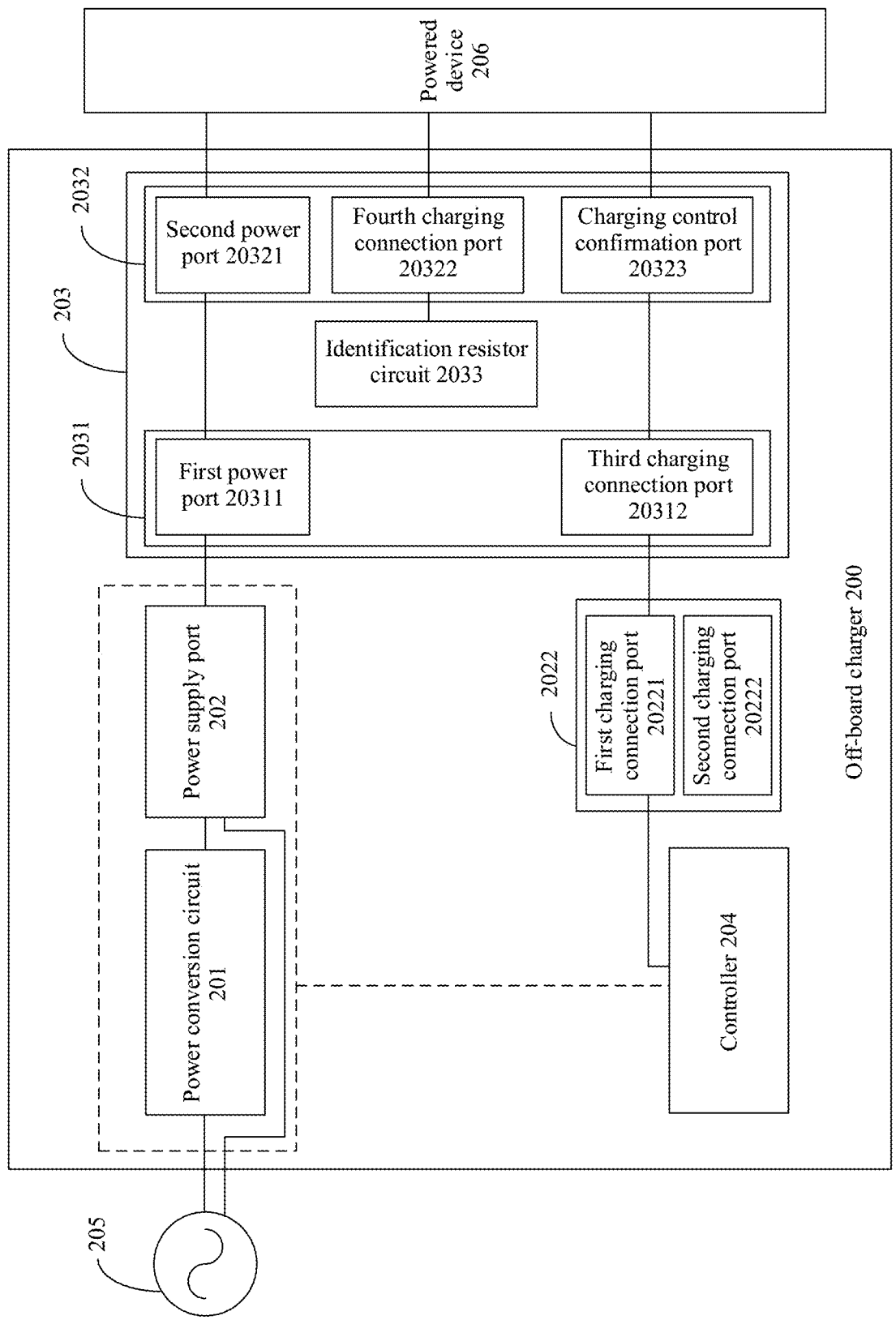
FIG. 3 is a schematic diagram 2 of a structure of an off-board charger.

In a possible implementation, FIG. 3 is a schematic diagram 2 of a structure of an off-board charger. The connection confirmation port 2022 specifically includes a first charging connection port 20221 and a second charging connection port 20222. The connection port 2031 specifically includes a first power port 20311 and a third charging connection port 20312. The alternating current output port 2032 specifically includes a second power port 20321, a fourth charging connection port 20322, and a charging control confirmation port 20323. The power supply port 202, the first power port 20311, and the second power port 20321 are configured to be connected in series, and the first charging connection port 20221, the third charging connection port 20312, and the charging control confirmation port 20323 are configured to be connected in series.

The controller 204 is specifically configured to: control, when the voltage of the first charging connection port 20221 is the first voltage, the power supply port 202 to connect to the alternating current power grid 205, the power supply port 202 to connect to the connection port 2031, and the alternating current output port 2032 to connect to the charging port of the powered device 206; or control, when the voltage of the first charging connection port 20221 is the second voltage and the voltage of the connection confirmation port 2022 is the second voltage, the input end of the power conversion circuit 201 to connect to the alternating current power grid 205, and the power supply port 202 to connect to the charging port of the powered device 206; and transmit a charging communication signal between the off-board charger 200 and the powered device 206 through the second charging connection port 20222.

A charging mode of the powered device 206 may be determined based on different voltages of the first charging connection port 20221. For example, when the voltage of the first charging connection port 20221 is 9 V, it is determined that the powered device 206 is in an alternating current charging mode, and the alternating current power grid 205 is controlled to connect to the power supply port 202, and the power supply port 202 is controlled to connect to the charging port of the powered device 206 through the conversion adapter 203; or when the voltage of the first charging connection port 20221 is 6 V, it is determined that the powered device 206 is in a direct current charging mode, the alternating current power grid 205 is controlled to connect to the power conversion circuit 201, and the power supply port 202 is controlled to connect to the charging port of the powered device 206.

The first charging connection port 20221 may be used as a CC1 port of direct current charging handshake communication, and the second charging connection port 20222 may be used as a CC2 port of direct current charging handshake communication. For example, during charging, the off-board charger 200 continuously monitors a connection status of a charging plug and a charging socket through an input voltage signal of the CC1 port. Once an exception occurs, the off-board charger 200 immediately disconnects an output of the power supply port 202. If the powered device 206 does not receive, within 100 ms, a charging level requirement packet or an impedance packet periodically sent by the CC2 port, the powered device 206 also disconnects from the power supply port 202. A person skilled in the art should know specific handshake communication steps and packet transmission manners of the CC1 port and the CC2 port in the off-board charger 200. Details are not described herein again. In this way, when the off-board charger 200 provided in this embodiment of this application is not connected to the conversion adapter 203, the powered device 206 in the direct current charging mode can also be charged.

When the powered device 206 in the alternating current charging mode needs to be charged, the first power port 20311 and the third charging connection port 20312 included in the connection port 2031 in the conversion adapter 203 and the second power port 20321, the fourth charging connection port 20322, and the charging control confirmation port 20323 that are included in the alternating current output port 2032 are configured to reconstruct the power supply port 202 into an interface that can be connected to and communicate with an alternating current powered port.

The first power port 20311 and the second power port 20321 in the conversion adapter 203 are used as electrical connection ports on two sides of the conversion adapter 203, the power supply port 202 is connected to the first power port 20311, and the first power port 20311 is connected to the second power port 20321. The power supply port 202, the first power port 20311, and the second power port 20321 are configured to be connected in series, so that the power supply port 202 charges the powered device 206 in the alternating current charging mode through the conversion adapter 203. The second charging connection port 20222 is in an idle state.

The first charging connection port 20221 is connected to the third charging connection port 20312, and the third charging connection port 20312 is connected to the charging control confirmation port 20323. The charging control confirmation port 20323 is used as a CP signal port of a CP signal transmitted during alternating current charging.

Figure 4:
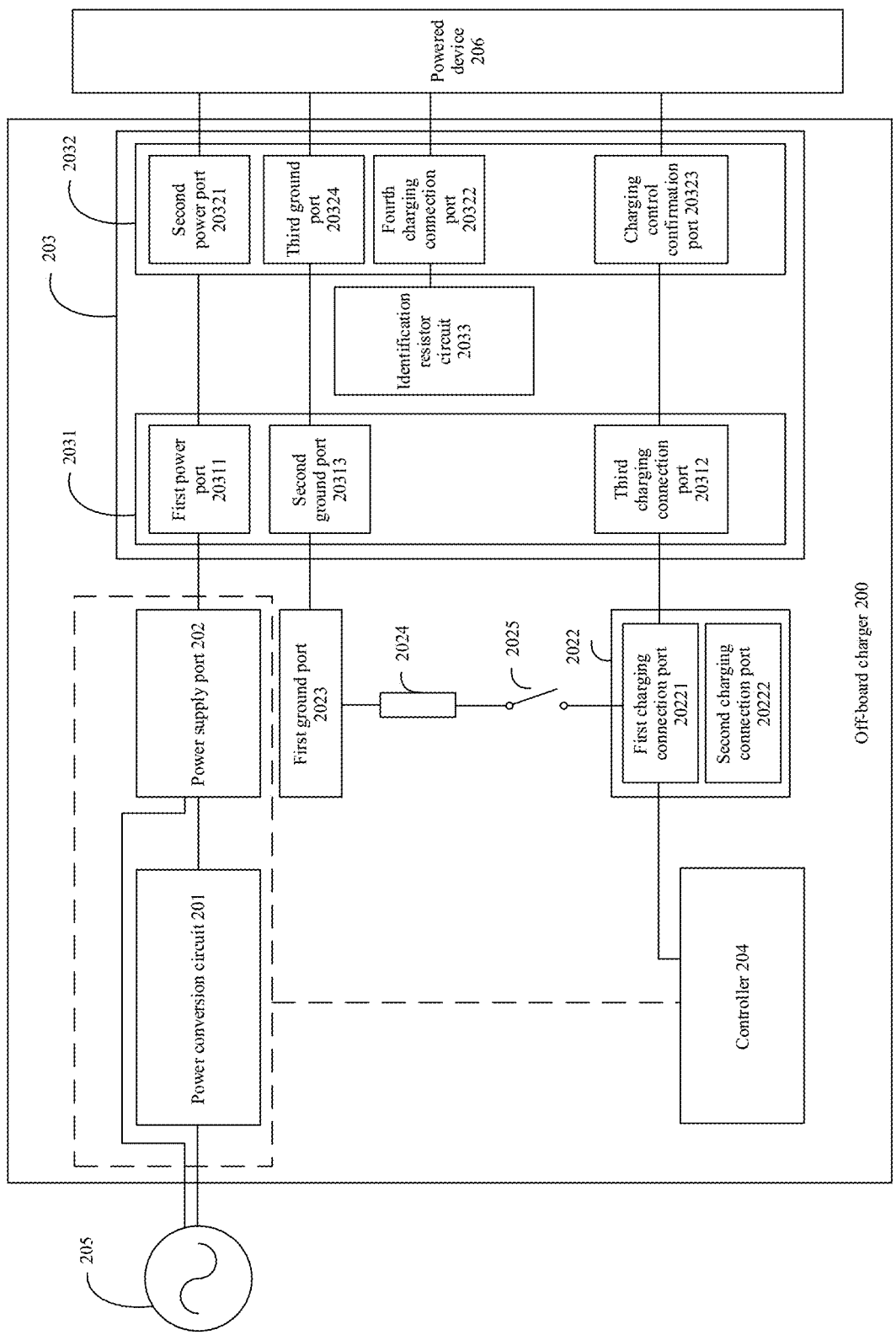
FIG. 4 is a schematic diagram 3 of a structure of an off-board charger.

To meet signal requirements of a CC signal port for transmitting a CC signal and a CP signal port for transmitting a CP signal, FIG. 4 is a schematic diagram 3 of a structure of an off-board charger. In a possible implementation, the off-board charger 200 further includes a first ground port 2023, a first resistor 2024, and a first switch 2025, the connection port 2031 further includes a second ground port 20313, and the alternating current output port 2032 further includes a third ground port 20324. The first ground port 2023, the second ground port 20313, and the third ground port 20324 are configured to be connected in series, and the first ground port 2023 and the first charging connection port 20221 are connected in series by using the first resistor 2024 and the first switch 2025. When the power supply port 202 is connected to the conversion adapter 203, the first switch 2025 is triggered to be turned on, so that the voltage of the first charging connection port 20221 in the connection confirmation port 2022 changes to the first voltage; or when the power supply port 202 is disconnected from the conversion adapter 203, the first switch 2025 is triggered to be turned off, so that the voltage of the first charging connection port 20221 in the connection confirmation port 2022 changes to the second voltage.

The first ground port 2023, the second ground port 20313, and the third ground port 20324 are configured to be connected in series, and may be used as protection ground ports to penetrate a connection between the power supply port 202 and the conversion adapter 203.

When being configured to be connected in series, the first charging connection port 20221, the third charging connection port 20312, and the charging control confirmation port 20323 may be used to transmit a charging communication signal between the off-board charger 200 and the powered device 206.

When the first switch 2025 is turned on and the first resistor 2024 is connected to the circuit, the voltage of the first charging connection port 20221 changes to the first voltage because a resistance increases and a divided voltage increases. When the first switch is turned off, and the first resistor 2024 is not connected to the circuit, the voltage of the first charging connection port 20221 changes to the second voltage because a resistance decreases and a divided voltage decreases.

The first switch 2025 may implement interlocking with a connection status of the conversion adapter 203 by using a specified mechanical structure or an electrical manner. To be specific, when the power supply port 202 is connected to the conversion adapter 203, an interlocking state is triggered, and the first switch 2025 is turned on; or when the power supply port 202 is disconnected (connected) from the conversion adapter 203, an interlocking status is released, and the first switch 2025 is turned off, so that the first charging connection port 20221 is disconnected from a ground cable.

Figure 5:
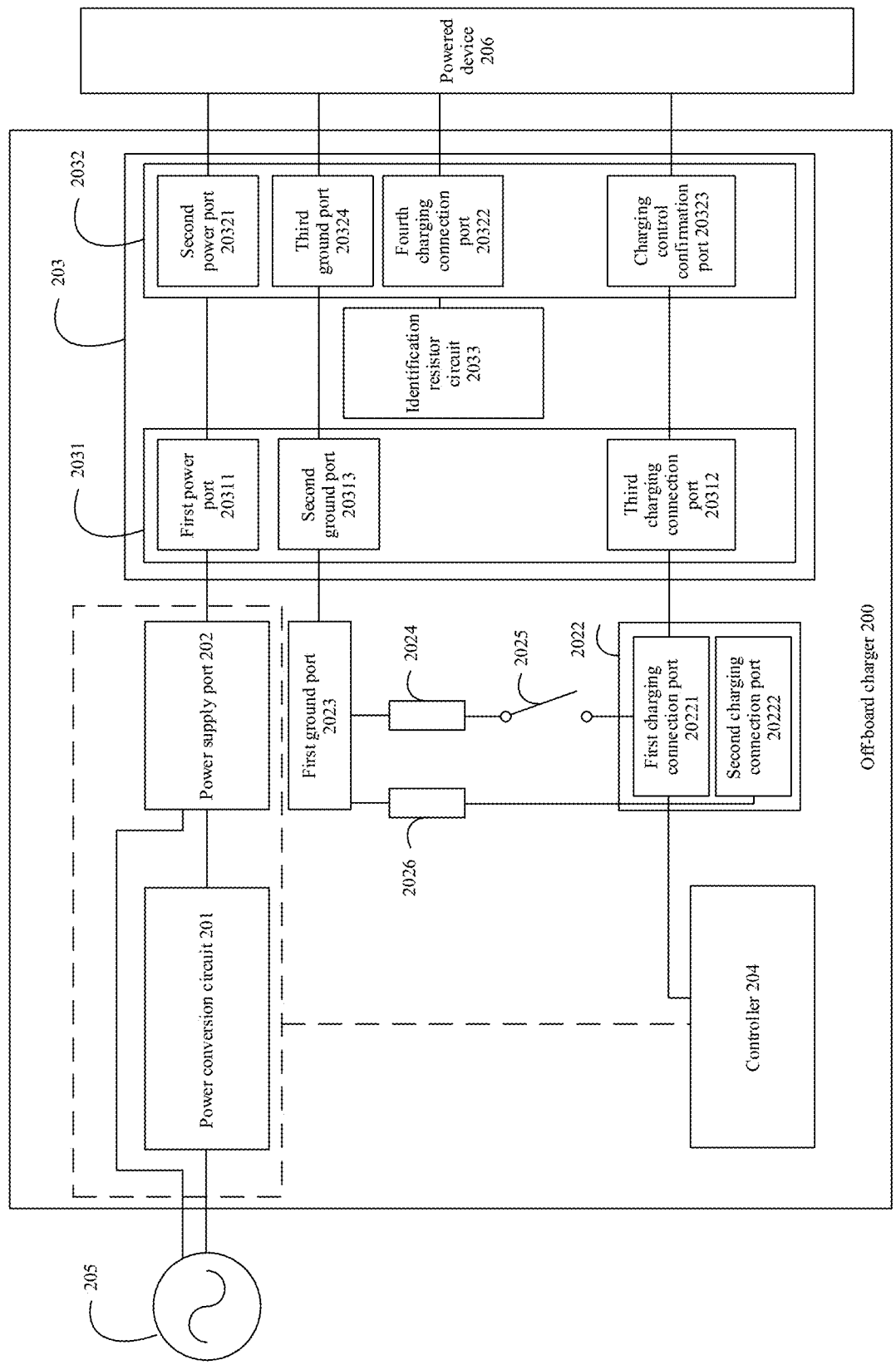
FIG. 5 is a schematic diagram 4 of a structure of an off-board charger.

In a possible implementation, FIG. 5 is a schematic diagram 4 of a structure of an off-board charger. The off-board charger 200 further includes a second resistor 2026. The first ground port 2023 is connected to the second charging connection port 20222 by using the second resistor 2026. When the powered device 206 is in the direct current charging mode, the alternating current power grid 205 is controlled to connect to the power conversion circuit 201, or when the power supply port 202 is connected to the charging port of the powered device 206, the second charging connection port 20222 is used as a CC2 port to communicate with the powered device 206.

Figure 6:
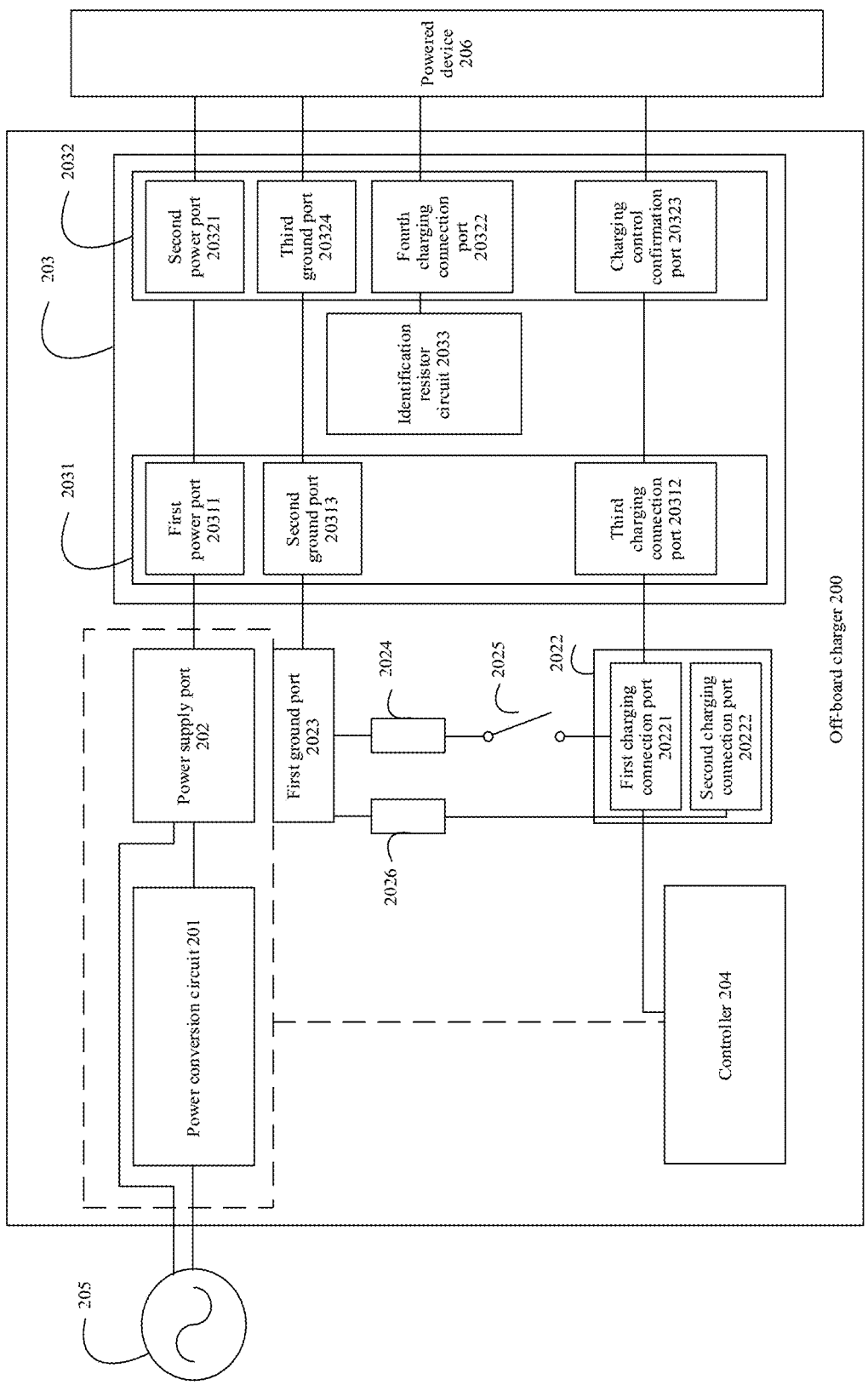
FIG. 6 is a schematic diagram of a connection of an identification resistor circuit in an off-board charger.

In a possible implementation, FIG. 6 is a schematic diagram of a structure of an identification resistor circuit. One end of the identification resistor circuit 2033 is connected to the third ground port 20324, and the other end of the identification resistor circuit 2033 is connected to the fourth charging connection port 20322. For example, the identification resistor circuit 2033 includes a plurality of resistors and a control switch. A resistance output by the identification resistor circuit 2033 may be adjusted by controlling on/off of the switch, so as to comply with the Electric Vehicle Conductive Power Supply System standard.

Figure 7:
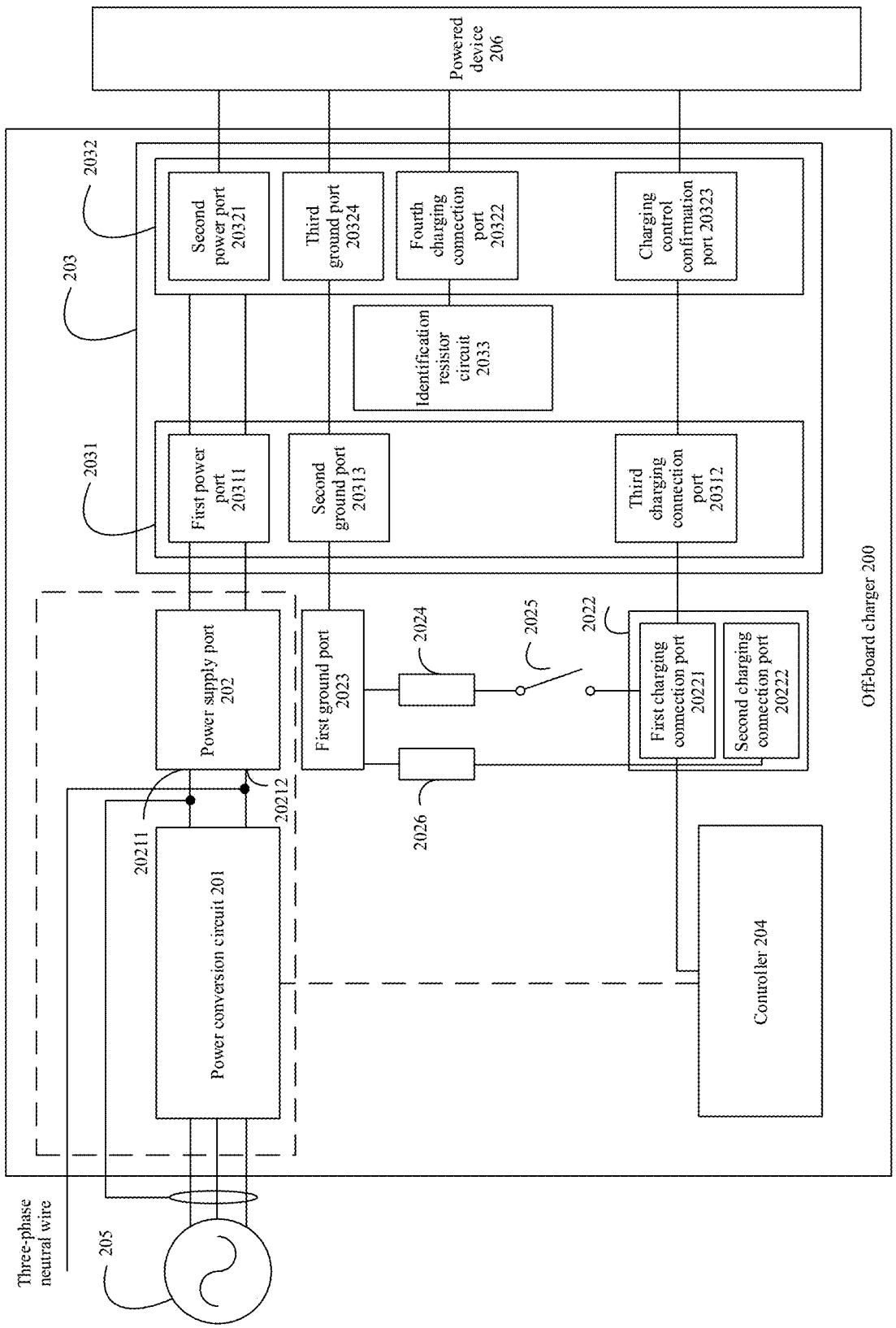
FIG. 7 is a schematic diagram 5 of a structure of an off-board charger.

In a possible implementation, FIG. 7 is a schematic diagram 5 of a structure of an off-board charger. The off-board charger 200 further includes a positive end 20211 of the power supply port and a negative end 20212 of the power supply port. The alternating current power grid 205 is connected to the input end of the power conversion circuit 201 through a first-phase alternating current power port, a second-phase alternating current power port, and a third-phase alternating current power port; or the alternating current power grid 205 is connected to the positive end 20211 of the power supply port through any one of a first-phase alternating current power port, a second-phase alternating current power port, and a third-phase alternating current power port; and the negative end 20212 of the power supply port is connected to a three-phase input neutral wire of the alternating current power grid.

Figure 8:
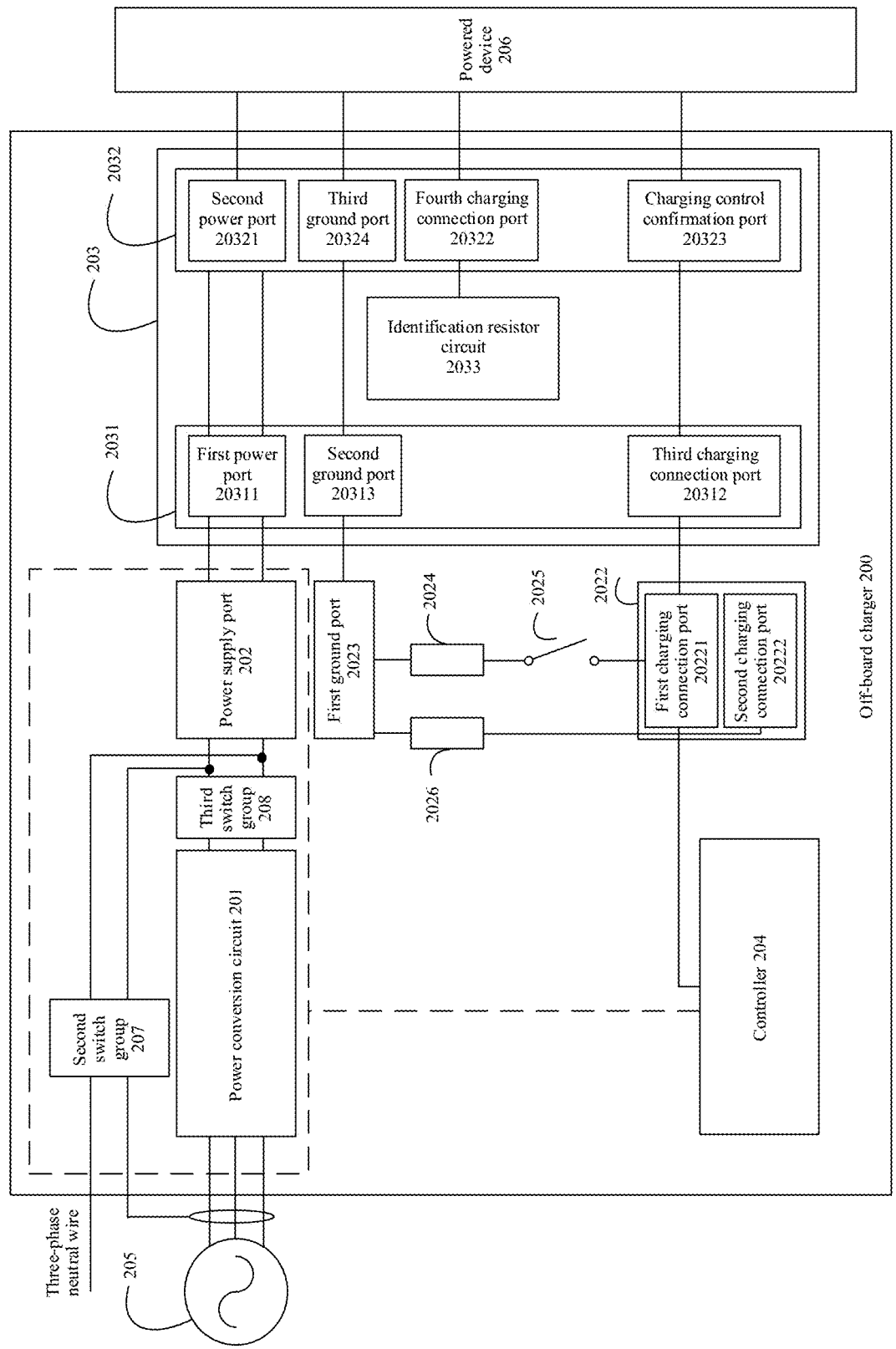
FIG. 8 is a schematic diagram 6 of a structure of an off-board charger.

In a possible implementation, FIG. 8 is a schematic diagram 6 of a structure of an off-board charger. The off-board charger 200 further includes a second switch group 207 and a third switch group 208. The alternating current power grid 205 is connected to the power supply port 202 by using the second switch group 207, and the power supply port 202 is connected to the third switch group 208 by using the power conversion circuit 201. When the second switch group 207 is turned on, the third switch group 208 is turned off; or when the second switch group 207 is turned off, the third switch group 208 is turned on.

An on/off relationship between switch groups on two sides of the power conversion circuit 201 is also mutually exclusive. When it is determined that the powered device 206 is in the alternating current charging mode, the identification resistance of the alternating current output port 2032 is adjusted to the target resistance, the alternating current power grid 205 is controlled to connect to the power supply port 202 by using the second switch group 207, and the power supply port 202 is controlled to connect to the charging port of the powered device 206 by using the conversion adapter 203; or when the powered device 206 is in the direct current charging mode, the alternating current power grid 205 is controlled to connect to the third switch group 208 by using the power conversion circuit 201, and the power supply port 202 is controlled to directly connect to the charging port of the powered device 206.

In a possible implementation, the controller 204 is further configured to: output, when the conversion adapter 203 is connected to the power supply port 202 (when the powered device 206 is in the direct current charging mode), a first communication signal to the connection confirmation port 2022; or output, when the conversion adapter 203 is disconnected from the power supply port 202 (when the powered device 206 is in the alternating current charging mode), a second communication signal to the connection confirmation port 2022.

The controller 204 can implement a control guidance function, and can meet direct current/alternating current handshake communication requirements of all electric vehicles meeting a national standard requirement. When the conversion adapter 203 is connected to the power supply port 202, that is, when it is determined that the powered device 206 is in the alternating current charging mode, because a CP signal required for communication in the alternating current charging mode is a PWM signal, when the powered device 206 is in the alternating current charging mode, the first communication signal (the PWM signal) is output to the connection confirmation port 2022; or when the conversion adapter 203 is disconnected from the power supply port 202, that is, when it is determined that the powered device is in the direct current charging mode, because a CC1 signal required for communication in the direct current charging mode is a step signal, the second communication signal (the step signal) is output to the connection confirmation port 2022.

For example, the controller 204 may output a step signal whose amplitude is 0 to N V or a PWM signal whose duty cycle is D and whose amplitude is 0 to N V. D ranges from 0% to 100%, and N is a positive integer. The controller 204 performs coding based on different PWM duty cycles and different signal amplitudes of the first communication signals, to indicate, to the powered device 206, parameters such as a current and a voltage that can be used by the off-board charger 200 for charging. In some examples, N meeting the national standard requirement may be 6 V, 9 V, or 12 V, and the powered device 206 may obtain, based on the duty cycle and the signal amplitude of the CP signal, the parameters such as the current and the voltage that can be provided by the off-board charger 200 for charging. When the duty cycle D is between 10% and 85%, a maximum charging current that can be provided by the off-board charger 200 is I=D× 100×0.6. However, when the duty ratio D=0%, it indicates that the off-board charger 200 is not available, or the like.

Figure 9:
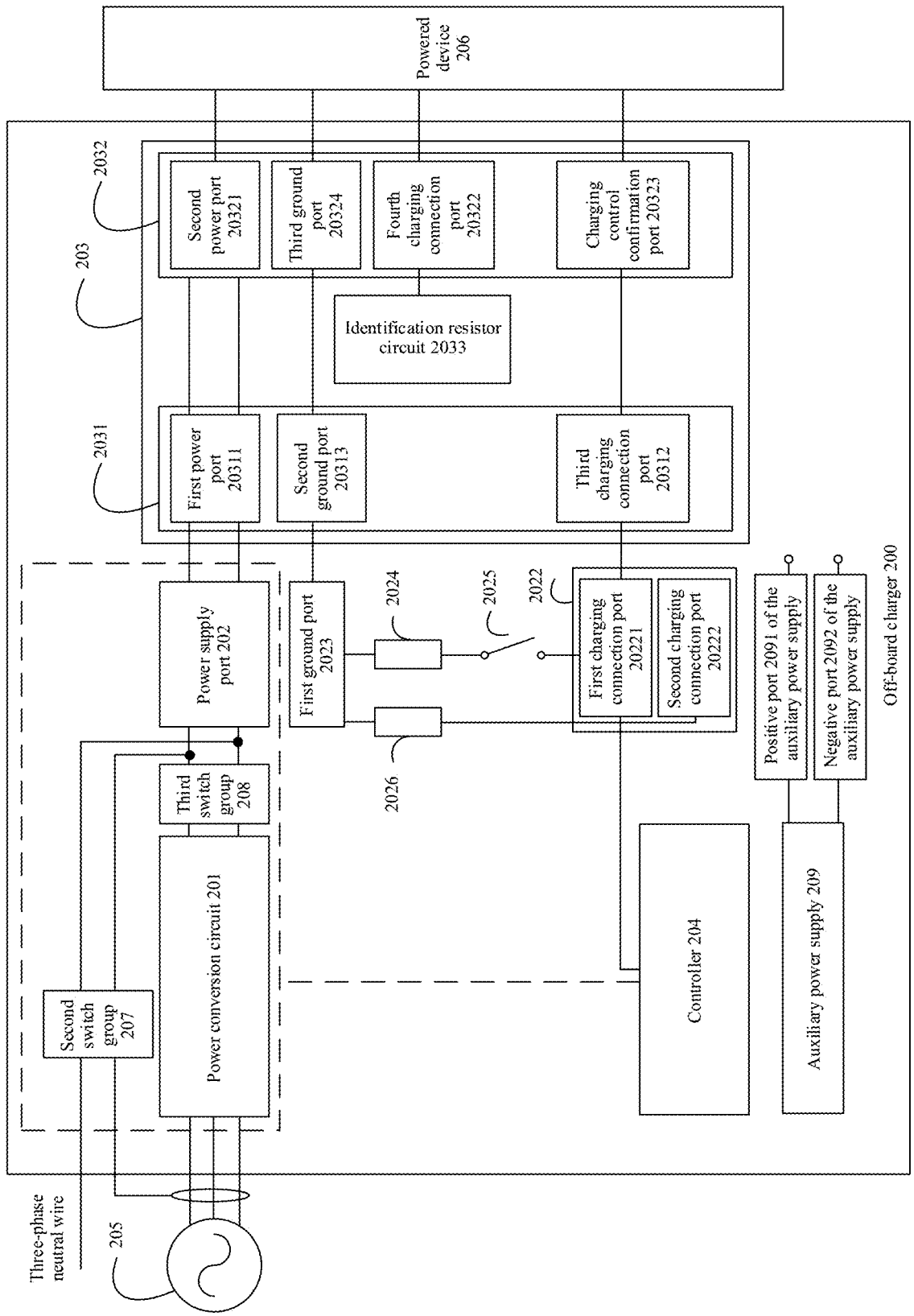
FIG. 9 is a schematic diagram 7 of a structure of an off-board charger.

In a possible implementation, FIG. 9 is a schematic diagram 7 of a structure of an off-board charger. The off-board charger 200 further includes an auxiliary power supply 209, a positive port 2091 of the auxiliary power supply, and a negative port 2092 of the auxiliary power supply. A positive output of the auxiliary power supply 209 is connected to one end of the positive port 2091 of the auxiliary power supply, and a negative output of the auxiliary power supply 209 is connected to one end of the negative port 2092 of the auxiliary power supply. When the power supply port 202 is connected to the conversion adapter 203, the other end of the positive port 2091 of the auxiliary power supply and the other end of the negative port 2092 of the auxiliary power supply each are in an idle state.

In actual application, compared with the direct current off-board charger 200, the direct current off-board charger 200 has two more power supply ports, namely, the positive port 2091 (A+) of the auxiliary power supply and the negative port 2092 (A−) of the auxiliary power supply. There is no actual signal or current transmission between the two ports and the powered device 206. Therefore, the two ports are set to the idle state, and the two ports do not need to be connected to the powered device 206.

Figure 10:
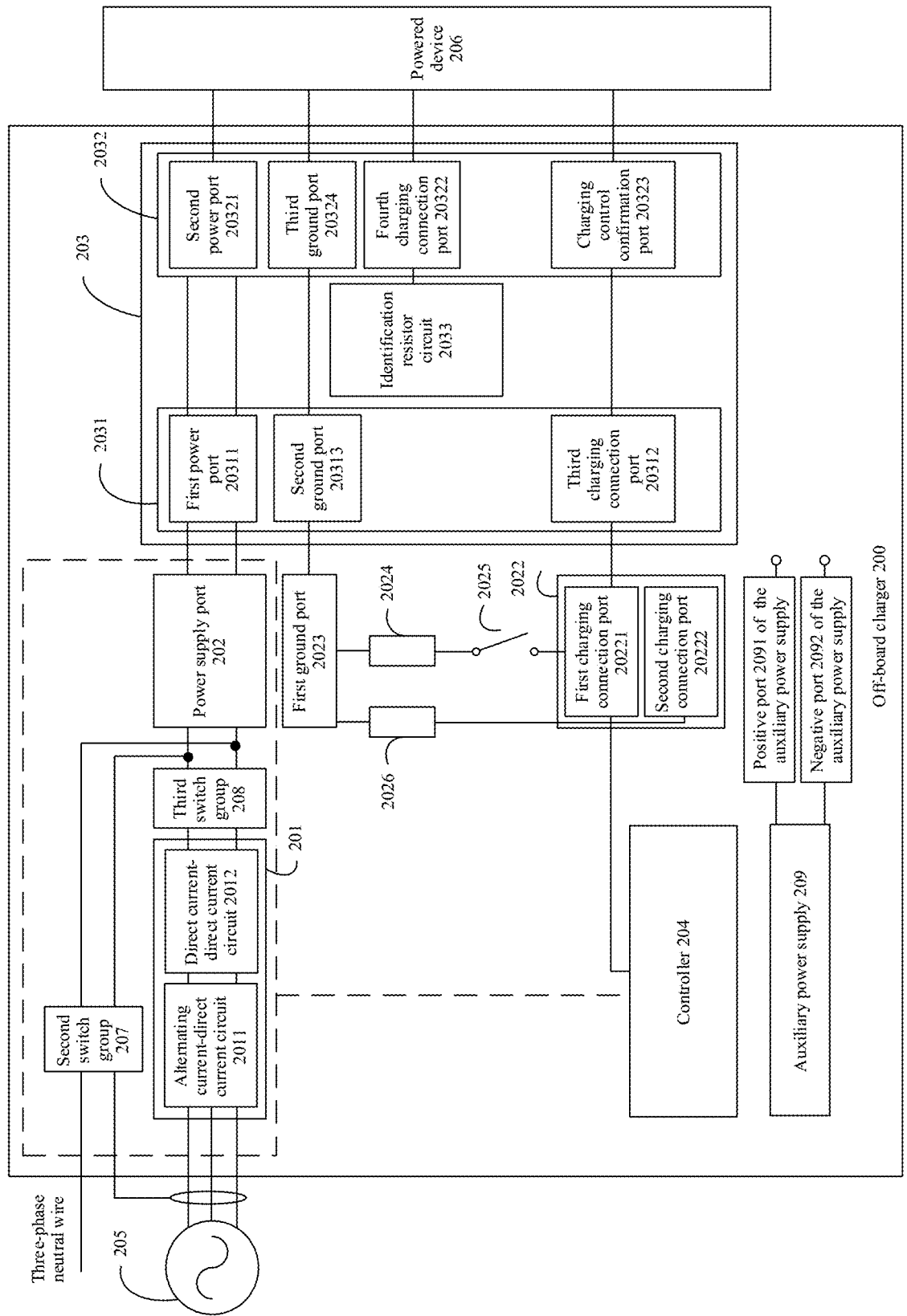
FIG. 10 is a schematic diagram 8 of a structure of an off-board charger.

In a possible implementation, FIG. 10 is a schematic diagram 8 of a structure of an off-board charger. The power conversion circuit 201 includes an alternating current-direct current circuit 2011 and a direct current-direct current circuit 2012. An input end of the alternating current-direct current circuit 2011 and the power supply port 202 are configured to connect to the alternating current power grid 205, an output end of the alternating current-direct current circuit 2011 is connected to an input end of the direct current-direct current circuit 2012, and an output end of the direct current-direct current circuit 2012 is connected to the power supply port 202.

The alternating current-direct current (alternating current-direct current, AC-DC) circuit 2011 is configured to convert an alternating current provided by the alternating current power grid 205 into a direct current, and the direct current-direct current (direct current-direct current, DC-DC) circuit 2012 is configured to adjust a direct current voltage output by the alternating current-direct current circuit 2011, so as to meet a charging requirement of the powered device 206.

It should be noted that the foregoing internal connections of the power supply port 202 and the conversion adapter 203 are merely examples in embodiments of this application. In embodiments of this application, the internal connections of the ports can be modified within a scope specified in a national standard, provided that a direct current/alternating current charging function of the vehicle can be compatible. This is not limited.

Figure 11:
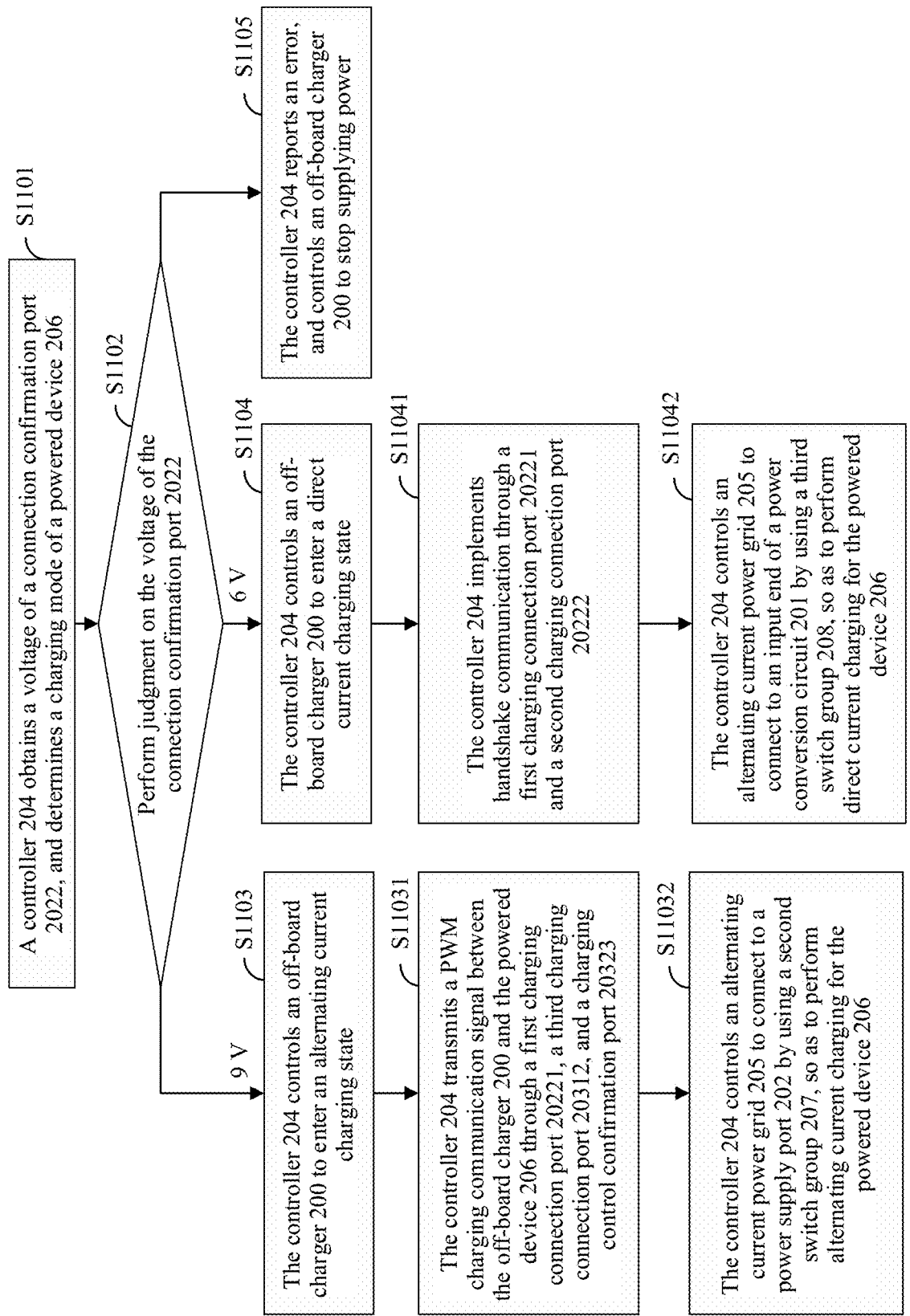
FIG. 11 is a flowchart of a charging control policy step of an off-board charger.

FIG. 11 is a flowchart of an example of steps of a charging control policy of the off-board charger in this application. The following steps are included.

Step S1101: The controller 204 obtains a voltage of the connection confirmation port 2022, and determines a charging mode of the powered device 206.

Step S1102: When the voltage of the connection confirmation port 2022 is 9 V, perform step S1103; or when the voltage of the connection confirmation port 2022 is 6 V, perform step S1104; or otherwise, perform step S1105.

Step S1103: The controller 204 controls the off-board charger 200 to enter an alternating current charging state.

Step S11031: The controller 204 transmits a PWM charging communication signal between the off-board charger 200 and the powered device 206 by using the first charging connection port 20221, the third charging connection port 20312, and the charging control confirmation port 20323.

Step S11032: The controller 204 controls the alternating current power grid 205 to connect to the power supply port 202 by using the second switch group 207, so as to perform alternating current charging for the powered device 206.

Step S1104: The controller 204 controls the off-board charger 200 to enter a direct current charging state.

Step S11041: The controller 204 implements handshake communication by using the first charging connection port 20221 and the second charging connection port 20222.

Step S11042: The controller 204 controls the alternating current power grid 205 to connect to the input end of the power conversion circuit 201 by using the third switch group 208, so as to perform direct current charging for the powered device 206.

Step S1105: The controller 204 reports an error, and controls the off-board charger 200 to stop supplying power.

The off-board charger provided in this application can be compatible with all types of electric vehicles in the market, and can not only provide a direct current charging service for a battery electric vehicle, but also provide an alternating current charging service for a plug-in hybrid electric vehicle. In addition, because of a newly added conversion adapter design, the off-board charger implements functions of both alternating current charging and direct current charging. This omits an alternating current charging gun cable and reduces costs.

Based on a same concept, this application further provides a charging system. The charging system includes a charging pile and a powered device, and the charging pile includes the off-board charger described in the foregoing embodiments; and the charging pile is configured to charge the powered device.

Based on a same concept, this application further provides a charging station. The charging station includes at least one charging pile, and each charging pile includes the off-board charger described in the foregoing embodiments; and a charging pile is configured to charge a powered device connected to the charging pile.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product that is implemented on one or more computer-usable storage media (including but not limited to a disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

It is clearly that a person skilled in the art can make various modifications and variations to this application without departing from the spirit and scope of this application. This application is intended to cover these modifications and variations of this application, provided that they fall within the scope of protection defined by the following claims and their equivalent technologies.

What is claimed is:

1. An off-board charger, comprising:
    a power supply port;
    a power conversion circuit that includes an output end connected to the power supply port;
    a conversion adapter that includes a connection port and an alternating current output port, the connection port is configured to be connected to the power supply port, and the alternating current output port is configured to be connected to a charging port of a powered device; and
    a controller configured to:
        control, when the conversion adapter is connected to the power supply port, the power supply port to connect to an alternating current power grid, the power supply port to connect to the connection port, and the alternating current output port to connect to the charging port of the powered device; or
        control, when the conversion adapter is disconnected from the power supply port, an input end of the power conversion circuit to connect to an alternating current power grid, and the power supply port to connect to the charging port of the powered device;
    an identification resistor circuit configured to adjust an identification resistance of the alternating current output port; and
        the controller is further configured to: control, when the conversion adapter is connected to the power supply port, the identification resistor circuit to adjust the identification resistance of the alternating current output port, so that an identification resistance of the alternating current output port is a target resistance and the off-board charger completes handshake communication with the powered device.

2. The off-board charger according to claim 1, wherein the off-board charger further comprises a connection confirmation port; and
    the controller is configured to: control, when a voltage of the connection confirmation port is a first voltage, the power supply port to connect to the alternating current power grid, the power supply port to connect to the connection port, and the alternating current output port to connect to the charging port of the powered device; or
    control, when a voltage of the connection confirmation port is a second voltage, the input end of the power conversion circuit to connect to the alternating current power grid, and the power supply port to connect to the charging port of the powered device.

3. The off-board charger according to claim 2, wherein the connection confirmation port comprises a first charging connection port and a second charging connection port;
    the connection port comprises a first power port and a third charging connection port, the alternating current output port comprises a second power port, a fourth charging connection port, and a charging control confirmation port, the power supply port, the first power port, and the second power port are configured to be connected in series, and the first charging connection port, the third charging connection port, and the charging control confirmation port are configured to be connected in series; and
    the controller is configured to: control, when a voltage of the first charging connection port is the first voltage, the power supply port to connect to the alternating current power grid, the power supply port to connect to the connection port, and the alternating current output port to connect to the charging port of the powered device; or
    control, when a voltage of the first charging connection port is the second voltage, the input end of the power conversion circuit to connect to the alternating current power grid, and the power supply port to connect to the charging port of the powered device; and transmit a charging communication signal between the off-board charger and the powered device through the second charging connection port.

4. The off-board charger according to claim 3, wherein the off-board charger further comprises a first ground port, a first resistor, and a first switch, the connection port further comprises a second ground port, the alternating current output port further comprises a third ground port, the first ground port, the second ground port, and the third ground port are configured to be connected in series, and the first ground port and the first charging connection port are connected in series through the first resistor and the first switch; and when the power supply port is connected to the conversion adapter, the first switch is triggered to be turned on, so that the voltage of the first charging connection port changes to the first voltage; or when the power supply port is disconnected from the conversion adapter, the first switch is triggered to be turned off, so that the voltage of the first charging connection port changes to the second voltage.

5. The off-board charger according to claim 4, wherein the off-board charger further comprises a second resistor, and the first ground port is connected to the second charging connection port through the second resistor.

6. The off-board charger according to claim 3, wherein when being configured to be connected in series, the first charging connection port, the third charging connection port, and the charging control confirmation port are applicable to transmission of the charging communication signal between the off-board charger and the powered device.

7. The off-board charger according to claim 1, wherein one end of the identification resistor circuit is connected to the third ground port, and the other end of the identification resistor circuit is connected to the fourth charging connection port.

8. The off-board charger according to claim 1, wherein the controller is further configured to:

output, when the conversion adapter is connected to the power supply port, a first communication signal to the connection confirmation port; or output, when the conversion adapter is disconnected from the power supply port, a second communication signal to the connection confirmation port.

9. The off-board charger according to claim 1, wherein the off-board charger further comprises a positive end of the power supply port and a negative end of the power supply port, the alternating current power grid is connected to the input end of the power conversion circuit through a first-phase alternating current power port, a second-phase alternating current power port, and a third-phase alternating current power port, or the alternating current power grid is connected to the positive end of the power supply port through any one of a first-phase alternating current power port, a second-phase alternating current power port, and a third-phase alternating current power port, and the negative end of the power supply port is connected to a three-phase input neutral wire of the alternating current power grid.

10. The off-board charger according to claim 1, wherein the off-board charger further comprises a second switch group and a third switch group; and the alternating current power grid is connected to the power supply port by using the second switch group, the alternating current power grid is connected to the input end of the power conversion circuit by using the third switch group, and when the second switch group is turned on, the third switch group is turned off, or when the second switch group is turned off, the third switch group is turned on.

11. The off-board charger according to claim 1, wherein the off-board charger further comprises an auxiliary power supply, a positive port of the auxiliary power supply, and a negative port of the auxiliary power supply, a positive output of the auxiliary power supply is connected to one end of the positive port of the auxiliary power supply, a negative output of the auxiliary power supply is connected to one end of the negative port of the auxiliary power supply, and when the power supply port is connected to the conversion adapter, the other end of the positive port of the auxiliary power supply and the other end of the negative port of the auxiliary power supply each are in an idle state.

12. The off-board charger according to claim 1, wherein the power conversion circuit comprises an alternating current-direct current circuit and a direct current-direct current circuit; and an input end of the alternating current-direct current circuit and the power supply port are configured to connect to the alternating current power grid, an output end of the alternating current-direct current circuit is connected to an input end of the direct current-direct current circuit, and an output end of the direct current-direct current circuit is connected to the power supply port.

13. A charging system, comprising:

a charging pile that further includes a power supply port, an off-board charger, a power conversion circuit having an output end connected to the power supply port, a conversion adapter, and a controller;

a powered device wherein:

the charging pile is configured to charge the powered device;

the conversion adapter comprises a connection port and an alternating current output port, the connection port is configured to be connected to the power supply port, and the alternating current output port is configured to be connected to a charging port of a powered device; and the controller is configured to:

control, when the conversion adapter is connected to the power supply port, the power supply port to connect to an alternating current power grid, the power supply port to connect to the connection port, and the alternating current output port to connect to the charging port of the powered device; or control, when the conversion adapter is disconnected from the power supply port, an input end of the power conversion circuit to connect to an alternating current power grid, and the power supply port to connect to the charging port of the powered device;

an identification resistor circuit configured to adjust an identification resistance of the alternating current output port; and the controller is further configured to: control, when the conversion adapter is connected to the power supply port, the identification resistor circuit to adjust the identification resistance of the alternating current output port, so that an identification resistance of the alternating current output port is a target resistance and the off-board charger completes handshake communication with the powered device.

14. A charging station, comprising:

at least one charging pile, wherein:

each charging pile of the at least one charging pile comprises an off-board charger and is configured to charge a powered device connected to the charging pile;

the off-board charger comprises a power conversion circuit, a power supply port, a conversion adapter, and a controller;

an output end of the power conversion circuit is connected to the power supply port;

the conversion adapter comprises a connection port and an alternating current output port, the connection port is configured to be connected to the power supply port, and the alternating current output port is configured to be connected to a charging port of a powered device; and the controller is configured to:
control, when the conversion adapter is connected to the power supply port, the power supply port to connect to an alternating current power grid, the power supply port to connect to the connection port, and the alternating current output port to connect to the charging port of the powered device; or control, when the conversion adapter is disconnected from the power supply port, an input end of the power conversion circuit to connect to an alternating current power grid, and the power supply port to connect to the charging port of the powered device;

an identification resistor circuit configured to adjust an identification resistance of the alternating current output port; and the controller is further configured to: control, when the conversion adapter is connected to the power supply port, the identification resistor circuit to adjust the identification resistance of the alternating current output port, so that an identification resistance of the alternating current output port is a target resistance and the off-board charger completes handshake communication with the powered device.

15. The off-board charger according to claim 14, wherein the connection confirmation port comprises a first charging connection port and a second charging connection port;

the connection port comprises a first power port and a third charging connection port, the alternating current output port comprises a second power port, a fourth charging connection port, and a charging control confirmation port, the power supply port, the first power port, and the second power port are configured to be connected in series, and the first charging connection port, the third charging connection port, and the charging control confirmation port are configured to be connected in series; and the controller is configured to: control, when a voltage of the first charging connection port is the first voltage, the power supply port to connect to the alternating current power grid, the power supply port to connect to the connection port, and the alternating current output port to connect to the charging port of the powered device; or control, when a voltage of the first charging connection port is the second voltage, the input end of the power conversion circuit to connect to the alternating current power grid, and the power supply port to connect to the charging port of the powered device; and transmit a charging communication signal between the off-board charger and the powered device through the second charging connection port.

16. The off-board charger according to claim 15, wherein the off-board charger further comprises a first ground port, a first resistor, and a first switch, the connection port further comprises a second ground port, the alternating current output port further comprises a third ground port, the first ground port, the second ground port, and the third ground port are configured to be connected in series, and the first ground port and the first charging connection port are connected in series through the first resistor and the first switch; and when the power supply port is connected to the conversion adapter, the first switch is triggered to be turned on, so that the voltage of the first charging connection port changes to the first voltage; or when the power supply port is disconnected from the conversion adapter, the first switch is triggered to be turned off, so that the voltage of the first charging connection port changes to the second voltage.

17. The off-board charger according to claim 14, wherein the off-board charger further comprises a connection confirmation port; and the controller is configured to: control, when a voltage of the connection confirmation port is a first voltage, the power supply port to connect to the alternating current power grid, the power supply port to connect to the connection port, and the alternating current output port to connect to the charging port of the powered device; or control, when a voltage of the connection confirmation port is a second voltage, the input end of the power conversion circuit to connect to the alternating current power grid, and the power supply port to connect to the charging port of the powered device.

\* \* \* \* \*